Aug. 10, 1937.         W. ZEH         2,089,321
PHOTOGRAPHIC SENSITIZER MATERIAL
Filed Feb. 3, 1932
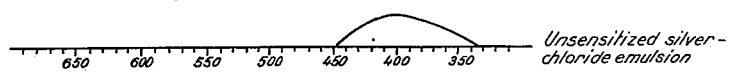
Fig.1 — Unsensitized silver-chloride emulsion
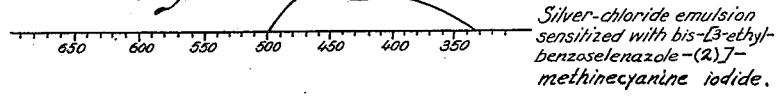
Fig.2 — Silver-chloride emulsion sensitized with bis-[3-ethyl-benzoselenazole-(2)]-methinecyanine iodide.
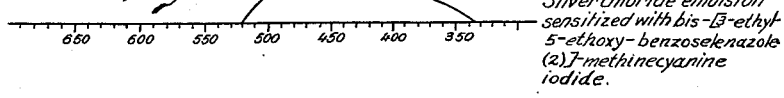
Fig.3 — Silver chloride emulsion sensitized with bis-[3-ethyl-5-ethoxy-benzoselenazole-(2)]-methinecyanine iodide.
Inventor:
Walter Zeh,
By Philip S. Hopkins,
Attorney.

UNITED STATES PATENT OFFICE 2,089,321

PHOTOGRAPHIC SENSITIZER MATERIAL

Walter Zeh, Dessau in Anhalt, Germany, assignor to Agfa Ansco Corporation, Binghamton, N. Y., a corporation of New York Application February 3, 1932, Serial No. 590,772
In Germany February 3, 1931

6 Claims. (Cl. 95—7)

My present invention relates to sensitizing of photographic materials.

One of its objects is to provide such an emulsion the sensitiveness of which is raised over the range of wave length to which the emulsion is normally sensitive or the sensitiveness of which is increased within the spectral region normally inherent to such an emulsion. Further objects will be seen from the detailed specification following hereafter.

Reference is made to the accompanying drawing which illustrates the difference between an unsensitized silver-chloride emulsion and an emulsion sensitized with my new sensitizing material.

I have found that a silver-halide emulsion especially a silver-chloride emulsion containing a benzoselenazolemethine-cyanine of the general formula Formula 1:

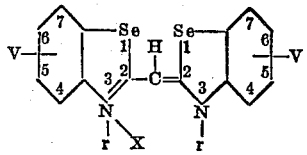

V=H, alkyl, alkoxy, benzene, halide,
r=alkyl,
X=halide, perchlorate, para-toluene, sulfonate, alkylo-sulfate, nitrate, shows an increased sensitiveness within the blue region of the spectrum. The range of sensitiveness of an emulsion comprising a short region of individual sensitiveness will be increased, or if the region of individual sensitiveness will not be increased by addition of the sensitizer its sensitiveness within the region of individual sensibility may be increased. The sensitizers are therefore well suited for sensitizing silver-chloride emulsions which may be used in color photography.

In general Formula 1 V may be linked to any position in the benzene nuclei, however, the 5 and 6 position and the 5' and 6' position are preferred. V may be an alkyl, such as methyl, ethyl, etc. or an alkoxy group, for instance, a methoxy or an ethoxy group, or halide, or benzene. r may be alkyl, for example methyl or ethyl. X can be any suitable anion, for instance, a halide, paratoluene sulfonate, alkylosulfate, perchlorate, nitrate, or the like.

In the accompanying graph there are reproduced 3 spectrograms of the same silver-halide gelatin emulsion.

Fig. 1 shows the spectrogram of an unsensitized silver-chloride emulsion,

Fig. 2 that of a silver-chloride emulsion containing bis-[3-ethyl-benzoselenazole-(2)]-methinecyanine-iodide, and Fig. 3 illustrates the spectrogram of silver-chloride emulsion containing bis - [3 - ethyl - 5 - ethoxy-benzoselenazole - (2)] - methinecyanine-iodide.

In these spectrograms the abscissae are graduated in millimicrons ($\mu\mu$) while the ordinates are graduated in divisions denoting the blackening of the tested film. The blackenings are taken by exposing the film in a diffraction grating spectrograph of Carl Zeiss, Jena, provided with a Rowland diffraction grating, and illuminating with a nitra lamp of 100 watts through a stage slot.

When comparing the curves the influence of the sensitizers on the sensitiveness of the emulsion may be easily seen. The spectrograms of the emulsion containing a sensitizing material is distinguished from the spectrogram of the unsensitized emulsion by its characteristic form.

The dyes are obtainable according to the desired solubility in form of the bromide, iodide, perchlorate, etc. and are used in a quantity as usual for the known sensitizing dyes. This quantity amounts to about 15 to 30 milligrams per 1 kg. of emulsion ready for being cast which contains about 9 per cent of gelatin, 4.5 per cent of silver-halide, the rest being water. However I do not wish to limit my invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes may be applied to the emulsion during any stage of its production, however, they are preferably added to the finished emulsion before being cast. The dyes may likewise be added by coating the emulsion with them or by bathing the finished photographic material in a bath in which the dye is dissolved. The dyes are suited for sensitizing an emulsion made according to the boiling process as well as for sensitizing an emulsion made according to the ammonia process.

The following examples serve to illustrate my invention.

*Example 1.*—For producing the dye bis-[3-ethyl-benzoselenazole-(2)]-methinecyanine-iodide corresponding to the formula

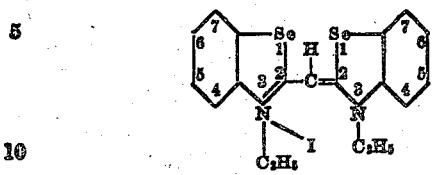

7 grams of 2-methyl-benzselenazole-ethyl-iodide are heated with 50 cc. of acetic anhydride until boiling and then there are added 3 cc. of amyl nitrite. While vehemently frothing the dye separates from the brownish yellow colored solution in form of greenish yellow flakes. By recrystallization from alcohol the dye is obtainable as green shining needles.

The alcoholic solution of the dye shows an absorption maximum at a wave length of about 420μμ.

Incorporated in a gelatino-silver-chloride emulsion the dye imparts to it a range of sensitiveness from about 430μμ to about 500μμ with a maximum at about 460μμ.

*Example 2.*—For producing the dye bis-[3-ethyl-5-ethoxy-benzoselenazole-(2)]-methinecyanine-iodide corresponding to the formula

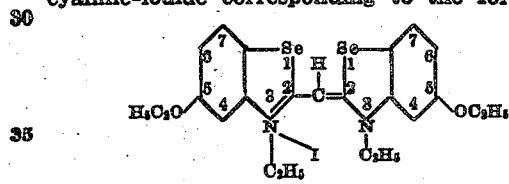

there are added 1.5 cc. of ethyl nitrite to a boiling solution of 4 grams of 2-methyl-5-ethoxy-benzselenazole-ethyl-iodide in 30 cc. of acetic anhydride. While vehemently frothing the dye separates from the solution in form of yellow flakes. The dye is obtainable in form of yellow felted needles by recrystallization from alcohol.

The alcoholic solution of the dye shows an absorption maximum at a wave length of about 440μμ.

Incorporated in a gelatino-silver-chloride emulsion the dye imparts to it a range of sensitiveness from about 430μμ to about 520μμ with a maximum at about 479μμ.

*Example 3.*—The dye bis-[3-ethyl-5-chloro-benzoselenazole-(2)]-methinecyanine-iodide corresponding to the formula

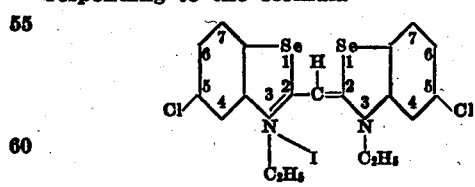

is precipitated from the boiling solution of 4 grams of 2-methyl-5-chloro-benzselenazole-ethyl-iodide in 30 cc. of acetic anhydride by addition of 2 cc. of amyl nitrite in form of greenish yellow flakes. Recrystallization of the dye from alcohol yields fine needles.

The alcoholic solution of the dye shows an absorption maximum at a wave length of about 425μμ.

Incorporated in a gelatino-silver-chloride emulsion the dye imparts to it a range of sensitiveness from about 430μμ to about 510μμ with a maximum at about 472μμ.

*Example 4.*—The dye bis-[3-ethyl-6-methoxy-benzoselenazole-(2)]-methinecyanine-iodide corresponding to the formula

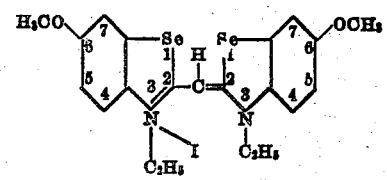

separates from a boiling solution of 4 grams of 2-methyl-6-methoxy-benzselenocyanine-iodide and 30 cc. of acetic anhydride by addition of 2 cc. of amyl nitrite in form of yellow flakes.

The alcoholic solution of the pure dye shows an absorption maximum at a wave length of about 435μμ.

Incorporated in a gelatino-silver-chloride emulsion the dye imparts to it a range of sensitiveness from about 430μμ to about 515μμ with a maximum at about 475μμ.

*Example 5.*—For producing the dye bis-[3-methyl-naphtho-1′.2′:4.5-selenazole-(2)]-methinecyanine-bromide corresponding to the formula

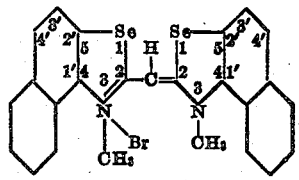

3 grams of 2-methyl-α-naphthol-selenazole-ethyl-bromide are heated with 10 cc. of acetic anhydride until boiling. The dye separates on addition of 1 cc. of amyl-nitrite from the brownish yellow colored liquid in form of small crystal druses. The filtered product is washed with acetone and ether and recrystallized from methanol.

The alcoholic solution of the dye shows an absorption maximum at a wave length of about 455μμ.

Incorporated in a gelatino-silver-chloride emulsion the dye imparts to it a range of sensitiveness from about 430μμ to about 530μμ with a maximum at about 485μμ.

The bases serving as a starting material for the production of the dyes are obtainable according to methods known from the preparation of the unsubstituted benzselenazoles.

It is to be understood that my invention is not limited to the foregoing examples nor to the specific details given therein. Numerous other embodiments are possible and I contemplate as included within my invention all such modifications and equivalents as fall within the scope of the appended claims. So, for instance, the benzene nuclei may contain one or more substituents. The nomenclature used is arbitrary, but it is familiar to every chemist skilled in the art and has the advantage of clearness. Numbering of the basis is commenced from the selenium atom and of the dyes from the nitrogen atom. The formulae of the dyes as given herein represent the molecular structure of my new dyes so far as known. If, however, in future it should become evident that the formulae do not exactly correspond to the dyes this fact will not affect my invention since the dyes will be easily identified by the method of producing the same which has been fully described in the examples and is analogous to known methods.

What I claim is:
1. A photographic material comprising a silver-halide emulsion containing bis-[3-ethyl-5-ethoxy-benzselenazole-(2)]-methinecyanine-iodide corresponding probably to the formula

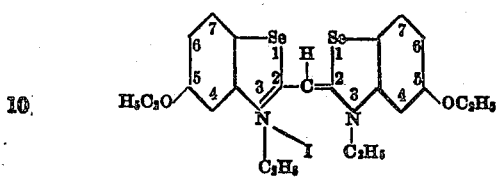

2. A photographic material comprising a silver-halide emulsion containing bis-[3-ethyl-6-methoxy-benzselenazole-(2)]-methinecyanine-iodide corresponding probably to the formula

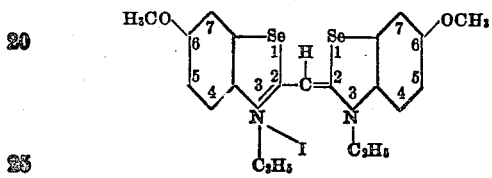

3. A photographic material comprising a silver-halide emulsion containing bis-[3-methyl-naphthol-1'.2':4.5-selenazole-(2)-]-methinecyanine-bromide, corresponding probably to the formula

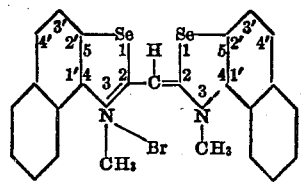

4. A photographic material comprising a silver halide emulsion containing a benzoselenazole-methine-cyanine salt.
5. A photographic material comprising a silver halide emulsion containing a benzoselenazole-methinecyanine salt substituted in the benzene nuclei by alkoxy.
6. A photographic material comprising a silver halide emulsion containing a benzoselenazole-methinecyanine salt substituted in the benzene nuclei by phenylene.

WALTER ZEH.